(12) United States Patent
Drissel et al.

(10) Patent No.: US 9,621,572 B2
(45) Date of Patent: Apr. 11, 2017

(54) STORAGE APPLIANCE AND THREAT INDICATOR QUERY FRAMEWORK

(71) Applicants: Joseph Drissel, Columbia, MD (US); James Hanson, Ellicott City, MD (US)

(72) Inventors: Joseph Drissel, Columbia, MD (US); James Hanson, Ellicott City, MD (US)

(73) Assignee: Cyber Engineering Services, Inc., Baltimore, MD (US)

( * ) Notice: Subject to any disclaimer, the term of this patent is extended or adjusted under 35 U.S.C. 154(b) by 23 days.

(21) Appl. No.: 14/217,406

(22) Filed: Mar. 17, 2014

(65) Prior Publication Data

US 2014/0283075 A1    Sep. 18, 2014

Related U.S. Application Data

(60) Provisional application No. 61/801,519, filed on Mar. 15, 2013.

(51) Int. Cl.
*H04L 29/06* (2006.01)
*G06F 17/30* (2006.01)

(52) U.S. Cl.
CPC .... *H04L 63/1433* (2013.01); *G06F 17/30979* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 7,213,154 B1* | 5/2007 | Carter | ................... | G06F 21/564 709/223 |
| 8,707,008 B2* | 4/2014 | Lowe | ................... | G06F 21/552 707/799 |
| 8,805,995 B1* | 8/2014 | Oliver | ................... | G06F 21/552 709/224 |
| 2004/0019688 A1* | 1/2004 | Nickerson | .............. | G06Q 30/02 709/229 |
| 2006/0150238 A1* | 7/2006 | D'Agostino | .......... | H04L 63/102 726/1 |
| 2006/0255929 A1* | 11/2006 | Zanovitch | .............. | G06Q 10/08 340/518 |
| 2008/0010683 A1* | 1/2008 | Baddour | .......... | G06F 17/30864 726/24 |
| 2008/0086773 A1* | 4/2008 | Tuvell | ..................... | G06F 21/55 726/23 |
| 2008/0086776 A1* | 4/2008 | Tuvell | ................... | G06F 21/564 726/24 |
| 2008/0196103 A1* | 8/2008 | Lin | .................... | H04L 63/1416 726/24 |

* cited by examiner

*Primary Examiner* — Azizul Choudhury
(74) *Attorney, Agent, or Firm* — Cipher Law

(57) ABSTRACT

Systems are described for capturing network traffic data and efficiently storing the data on solid state storage devices. The systems can include a capture process module, a storage management module, and a query module. The storage management module can include circuitry configured to hold an arbitrarily large number of solid state storage devices configured to appear to a host system as a single large solid state drive.

19 Claims, 6 Drawing Sheets

STORAGE APPLIANCE AND THREAT INDICATOR QUERY FRAMEWORK

CROSS-REFERENCE TO RELATED APPLICATIONS

This application hereby claims priority under 35 U.S.C. §119(e) to U.S. Provisional Application Ser. No. 61/801,519, entitled "Threat Indicators Framework" filed on Mar. 15, 2013, the contents of which are herein incorporated by reference

FIELD OF THE INVENTION

The invention generally relates to systems and method for identifying threats to information security and storing information relating to those threats.

BACKGROUND OF THE INVENTION

Enterprises may face a number of operational challenges when performing incident response and long-term maintenance support for its clients. The volume of information requiring analysis is enormous, and analysis is performed using mostly manual techniques and general purpose tools. At the present time cross-system, cross-domain, and temporal analysis is very difficult due to a lack of tools, procedures, and consistent data structure. Efforts to document and catalogue indicators of malware and related artifacts have encountered scaling and consistency problems. The sum total of these problems results in increased operational cost for enterprises and decreased value for our clients.

DETAILED DESCRIPTION

System Overview

Figure 1:
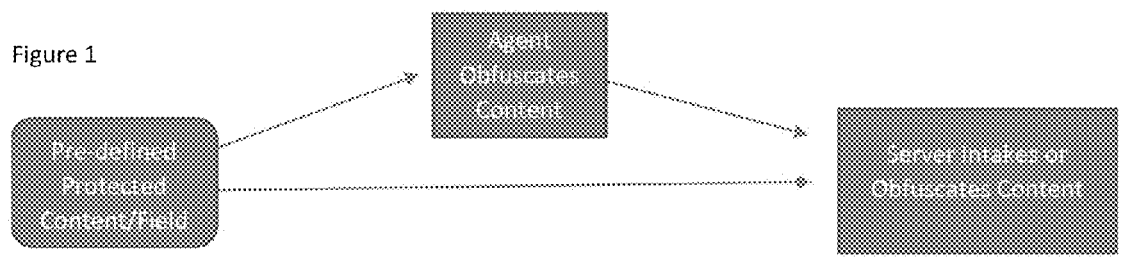
FIG. 1 illustrates an example model for intake of content obfuscated by an agent.
Figure 2:
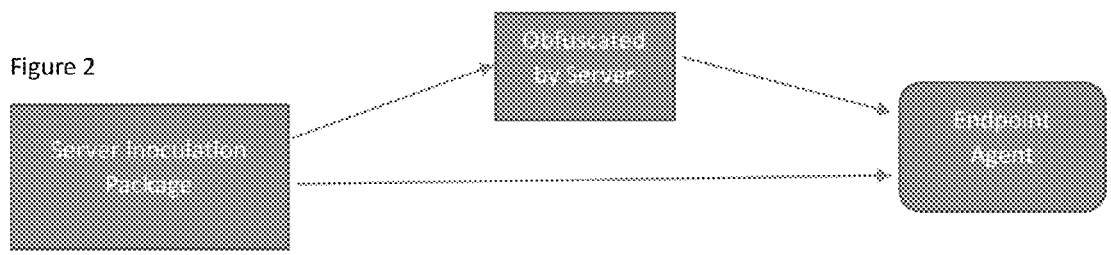
FIG. 2 illustrates an example model for intake of content obfuscated by a server.
Figure 3:
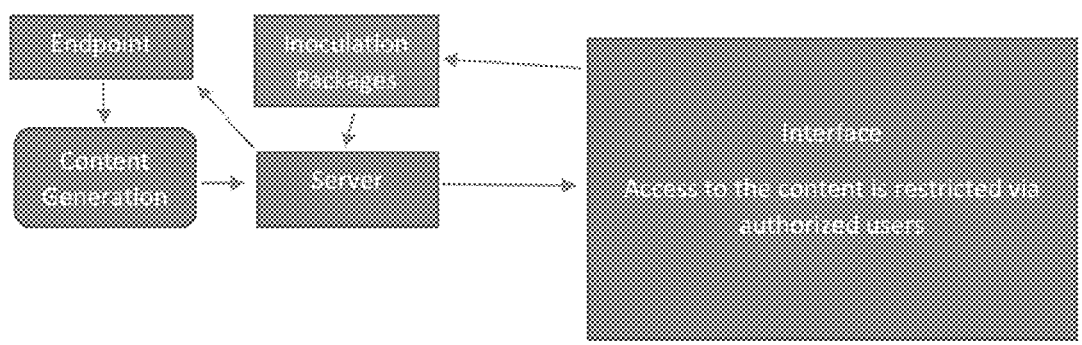
FIG. 3 illustrates an example model for allowing access to restricted content.
Figure 4:
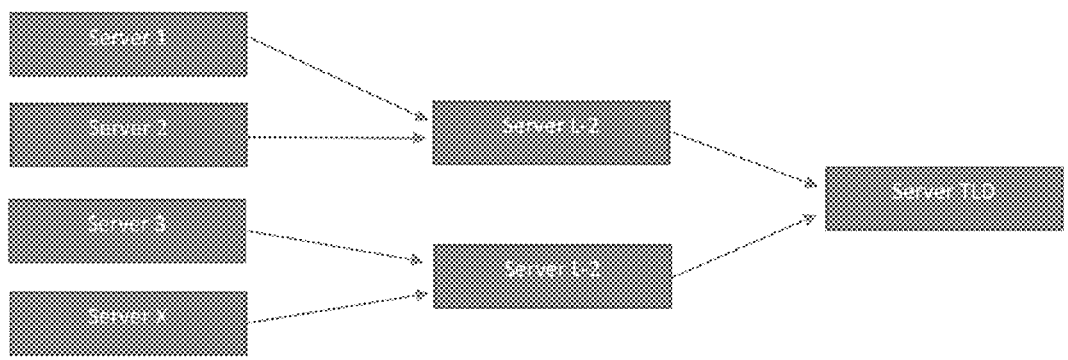
FIG. 4 illustrates an example architecture for content dissemination.
Figure 5:
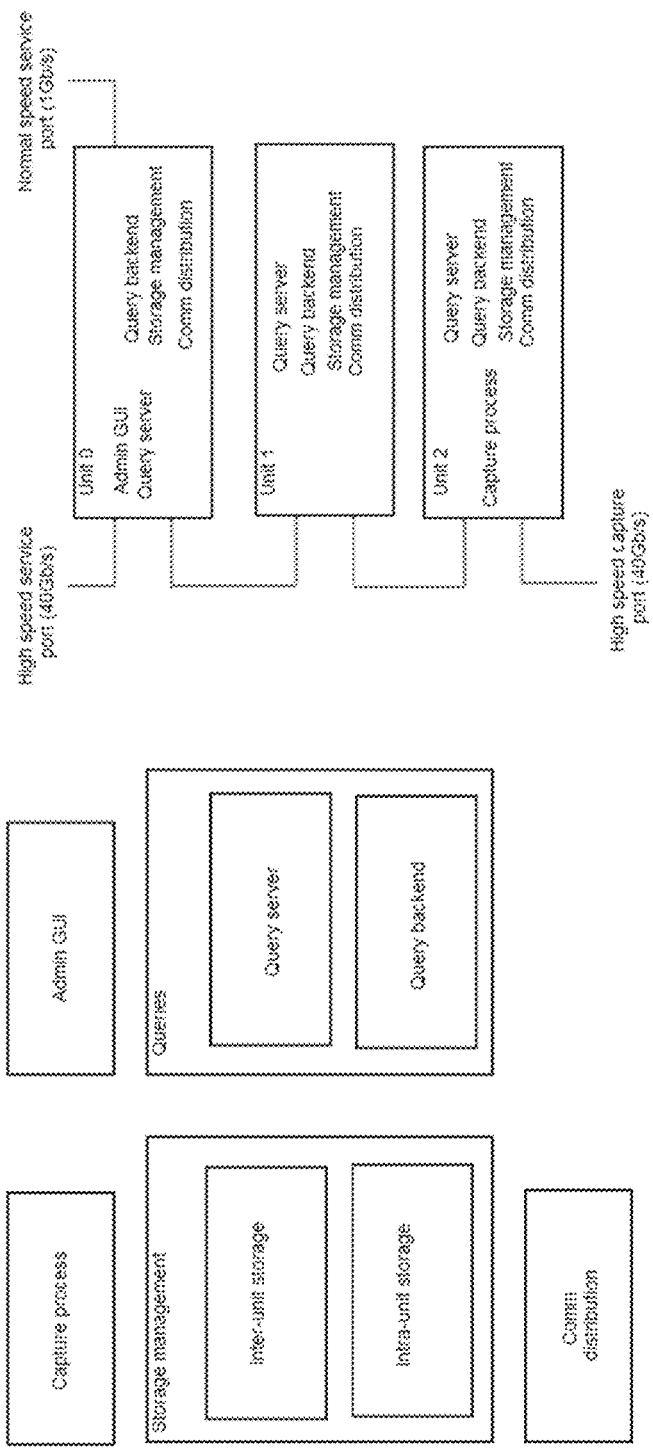
FIG. 5 illustrates an example architecture for a storage appliance including query support.
Figure 6:
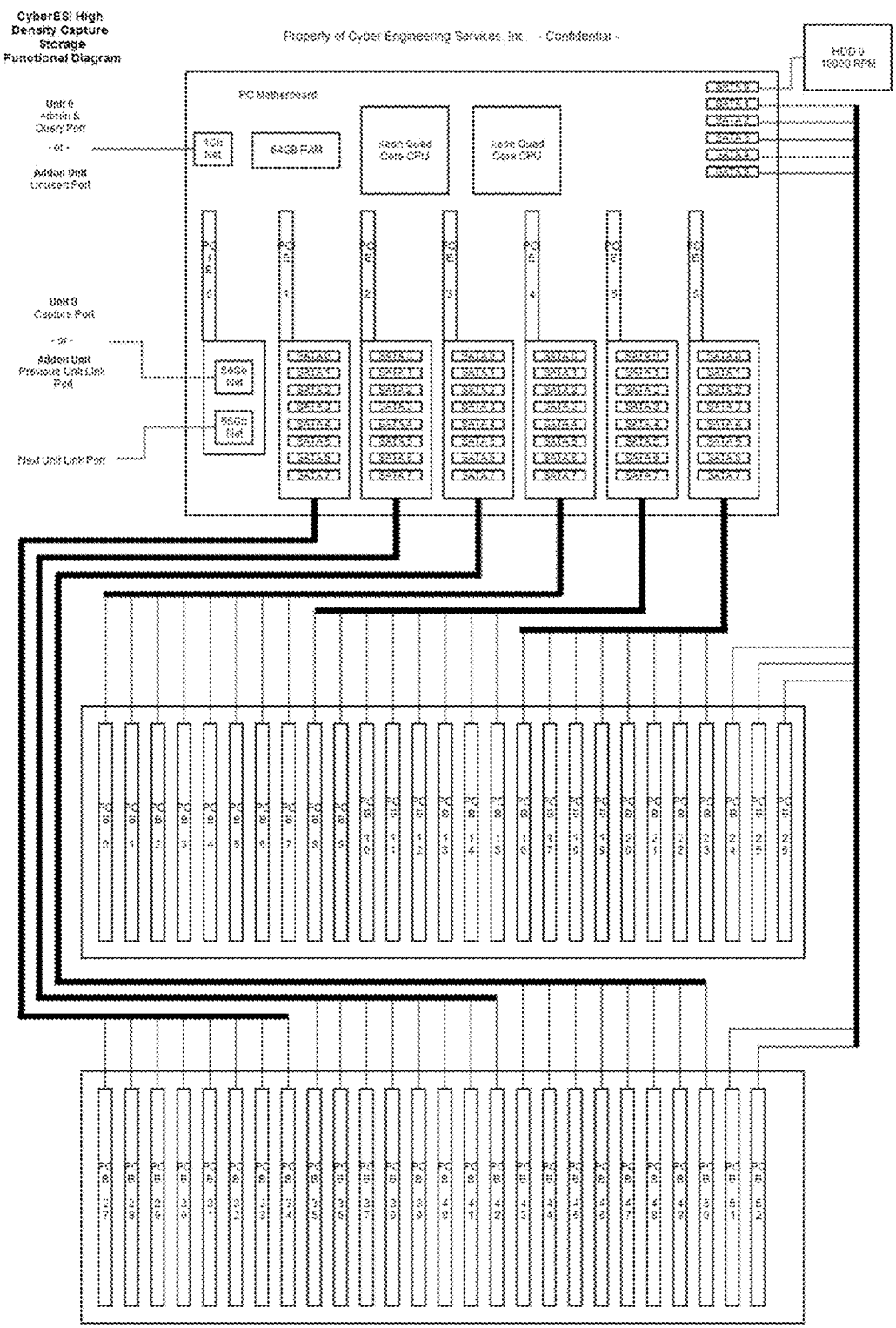
FIG. 6 illustrates an example architecture for storage appliance hardware.

The system is an effort to satisfy the operational requirements of both incident response and long-term maintenance support while also creating a common workflow for both. The system can define and utilize a common data structure through which almost any system information can be communicated, stored, retrieved, and analyzed while retaining as much relevant contextual information as possible. The system can be flexible enough to support a number of different deployment and usage scenarios, including geographically distant installations, offline system collection, long-term data cataloging, interactive querying, automatic reporting, etc. The system can scale to support large volumes of data and large numbers of audited systems. The system can also provide a mechanism through which indicators of intrusion, malware, and other related artifacts can be expressed, stored, managed, and applied.

A relatively small deployment of the system can consist of one physical server provisioned by an operator with an operating system and relevant software installed and configured prior to deployment at an enterprise site. As a non-limiting example, the system can be configured to run a 64-bit distribution of Linux.

The system can be provisioned with sufficient storage such that the software does not need to employ intensive techniques for data reduction. The system can be configured to optimize for functional performance and scalability.

The system can be configured to establish bi-directional communication with any target machine to be audited. In cases where bi-directional communication cannot be established between the server and endpoints, external media and manual operation may be used.

The system can be scaled horizontally to allow for increased storage, message distribution throughput, query capacity, and data transfer throughput.

During a deployment, a namespace can be configured for the system that maps to a DNS namespace. This namespace can be used exclusively for the system.

Timestamps can be stored in UTC with an associated time zone delta, if applicable. Any information that is acquired in non-UTC can be converted to UTC and tagged with the appropriate time zone delta, if available. In some embodiments, time zones are not transmitted between Services or systems in non-UTC.

The system can be configured to create GUIDs that are likely-unique within the context of a single system deployment. Intra-deployment UUIDs may also be used.

Message metadata and content can be stored and transferred in XML.

As used herein:

UUID: A globally unique identifier for a collection, document, record, or other object.

System: A deployment with one or more servers, the servers hosting one or more system services.

Server: A single physical server hosting one or more system services.

Service: A system service that provides specific functionality.

Cluster: A system with two or more servers.

Endpoint: The computer system to be audited and controlled using the system agent.

Agent: The system agent software running on an endpoint, can communicate with the system.

Audit: A collection of structured information gathered from an endpoint.

Audit Bundle: A collection of audits.

Audit Module: A software component of the agent that provides collection/processing functionality.

Task: An instruction of work to be processed by an agent on an endpoint.

IOC: A document describing an indicator of relevant activity.

Detection Approaches

Individual File Characteristics

This approach to detecting individual unique files depends on a distinctive characteristic of the file, such as hash value, file path, etc.

Data Group Characteristics

This approach attempts to detect a grouping of similar files based on shared characteristics, such as strings, metadata, instruction sequences, etc.

Semantic Characteristics

This approach attempts to detect indicators based on the effect they would have or have had on system state, such as entrenchment in sensitive registry keys, installation of a suspicious service, API usage associated with process injection, rootkit activity, etc.

Temporal and Statistical Characteristics

This approach takes a bulk of information and attempts to detect individual records that may be pertinent based on aspects such as the relationship between records, frequency analysis, trending, statistical evaluation, etc.

Server Components

Multiple services can be configured to be running on the same server or on multiple servers. For performance or other reasons, the system can be configured to allocate a subset of these services to run on any given server while accounting for the fact that a particular service may not be local. A system-wide configuration or registry can be used to define the location of each instance of each service.

Agent Service

The agent service can be configured to perform some or all of the following functions:

An agent service can be used to discover running agents on the network.

Allow agents to register themselves (in some cases, using SSL certificate signing).

Configures agent packages (.exe, .msi, .zip, etc.) with the correct system configuration.

Provides packages to users for manual deployment (by USB, etc.).

Deploys agents to endpoints if provided with sufficient credentials.

Disables, uninstalls, upgrades, or otherwise modifies the configuration of the agents on the network.

Coordinates with other agent services that may be running in the cluster.

Provides an interface for agents to communicate with a messaging service.

Messaging Service

The messaging service can be configured to perform some or all of the following functions:

Based on Advanced Message Queuing Protocol (AMQP).

Provides message routing between services and servers in the cluster.

Provides reliable transport, guaranteed delivery, and/or message integrity (through signing).

Provides a publish/subscribe model, asynchronous processing, and/or work queues.

May be a commercial or open source option (for example, RabbitMQ, SwiftMQ, QPid, etc)

Can be configured to scale with the cluster.

Provides workflows.

Certificate Service

The certificate service can be configured to perform some or all of the following functions:

Maintains the root CA certificate for the system.

Exposes an API that allows for the signing of agent certificates by services.

Supports the bootstrapping process of a new cluster server by synchronizing the root CA certificate with the new servers.

Synchronizes the certificate revocation list (CRL) for the system.

Storage Service

The storage service can be configured to perform some or all of the following functions:

Stores authoritative documents (e.g. in audit bundles) on storage media and maps to UUIDs.

Serves documents via UUIDs.

Coordinates with other storage services that may be running in the cluster.

Task Service

The task service can be configured to perform some or all of the following functions:

Manages the authoritative list of tasks executing on agents and their state.

Coordinates with other task services that may be in the cluster.

Query and Detection Service

The query and detection service can be configured to perform some or all of the following functions:

Automatically run IOCs against incoming data sources to identify matches and stores results and/or alerts users.

Perform statistical and temporal analysis on incoming documents.

Manages the authoritative IOC database and provides an API to sync, add, remove, or change records.

Transform Service

The transform service can be configured to perform some or all of the following functions:

Transforms data from documents or other sources into new documents or relational databases, stores a mapping where appropriate to document the relationship between records and document UUIDs.

Allows users to define new transforms to be performed and provides the resulting data to the user.

Automatically applies transforms to selected types or sources of incoming data.

May be supplied by a commercial XML database.

Document Index and Search Service

The document index and search service can be configured to perform some or all of the following functions:

Can be provided by a commercial XML database, such as MarkLogic.

Provides an API for adding, indexing, and/or searching documents.

Provides a query interface supporting XQuery and subset languages.

Relational DB Service

The relational database service can be configured to perform some or all of the following functions:

Provides storage for data structures that map to the relational model (agent lists, certificate stores, etc.)

Provides temporary storage for transform and query operations that would benefit from relational indexed data stores.

Can also be used to cache certain types of results that are created by long-running document queries.

Can support multi-master cluster scaling.

Can be a commercial database, such as Oracle, or an open source alternative such as PostgreSQL.

Client UI Service

The client user interface service can be configured to perform some or all of the following functions:

Provides a secured web interface accessible only to clients with current credentials, associated user certificate, and optionally a secure token.

Allows users to configure the system itself, add/remove servers, add/remove users, bootstrap the first server, etc.

Allows users to browse agent listings, metadata, etc.

Allows users to manage tasks, view status of tasks, etc.

Allows users to launch predefined queries and craft new queries, and review results.

Allows users to define transforms, review the results, etc.

Provides configurable event notification to users (popup, SMS, email).

Allows users to export data including documents, query results, binary containers, etc.

Allows users to mark documents and result items with tags (reviewed, pertinent, etc).

Allows users to organize documents, results, etc, into domains/cases.

Provides a uniform RESTful API for extensible components on the desktop, or other services.

Sync Service

The sync service can be configured to perform some or all of the following functions:

Responsible for synchronizing select configuration information and objects between systems with mutual trust.

Used as a means of global distribution of IOCs, transforms, etc.

Data Aggregation Service

The data aggregation service can be configured to perform some or all of the following functions:

Leverages the existing transform, and document services to perform data reduction and aggregation on a regular and/or automatic basis.

The summary and aggregate information can be forwarded in a secure manner to a system one tier up in the hierarchy that allows analysts a cross-domain view of summary and aggregate information.

This service may also be responsible for relaying queries from higher tiers to local services such that analysts at the higher tiers can perform cross-system queries.

Can be a factor in important for scaling a continuous monitoring operation.

Clustering

In some embodiments, it may be possible to push underlying protocols through software VPNs shared among cluster members. This may impose its own limitations based on the overall VPN topology (star vs. mesh, etc.). The number of protocols that traverse the client network can be reduced, in some embodiments by extending and leveraging the messaging service where possible.

Operating System

In some preferred embodiments, a 64-bit Linux distribution can be used for server systems.

Server-Agent Messaging Strategies

Some of all of the communication strategies described can be used for implementing the system. In a preferred embodiments, SSL can be implemented so as to provide mutual authentication, integrity, and confidentiality between the server and the agent prior to any message exchange. This can be accomplished by establishing a trusted domain with the system as the root authority. Agents can be registered with the server to have their individual certificates signed by a server to allow them to participate in the network. In addition, a CRL can be established that allows for any certificates to be revoked (including agent and service certificates). In some embodiments, the agents may be running on user workstations. In other embodiments, the agent may also be deployed on client server systems that may have different restrictions.

Beaconing

This strategy involves the agent periodically establishing a connection to a name or address on the network in order to retrieve messages, update agent information, etc. This strategy can be used to mimic the behavior of other services being used on the network (email, web, etc.) wherein the client (or agent) initiates connections to the server. The frequency with which these beacons occur can be configurable. Beacons with a high frequency can result in excessive network chatter, and beacons with a low frequency can result in messages not being transported in a timely manner (latency).

Persistent Connection

The system can be configured so that the agent attempts to maintain a persistent connection to a name or address on the network. This connection can be re-established whenever it goes down for any reason. This generally works well because it follows the same flow as other network services (outbound connections from the target system) and messages are passed quickly between systems.

Incoming Connection

The system can be configured so that the agent is listening on a chosen port, and then it initiates an outbound connection to the server to inform the server of its network configuration (address, port, etc.). Optionally the server could scan the network for agents with a listening port available. Whenever the network status of the agent changes (new IP, new gateway, etc.), this information is forwarded via outbound connection to the server. Otherwise, messages are passed by the server initiating a connection to the agent via the provided network information.

Hybrid Approaches

Various hybrid approaches that could also be used. For example, both the Agent and the server can initiate connections that result in message transfers. The system can also be configured to choose auto-adjusting beaconing that is throttled based on available resources or user defined priorities. Alternatively, the system could be configured to choose a persistent connection that is established for a period of time as a result of a message/task demanding high interactivity.

Time Synchronization

Servers can be synchronized with an external time authority and configured to use UTC locally. In cases where a limited subset of the cluster has access to a time authority, a cluster member can be configured with access to an external time authority as an alternate time authority for the affected systems.

SSL Implementation

Communication over the network can be contained within SSL streams. System components including services and agents can validate the exchanged SSL certificates. The following considerations can be taken into account:

Target Machine

The agent can be configured to produce or obtain a unique SSL certificate for each machine if it is intended to communicate with the system over the network.

The agent can contain both a CA public key and CRL for the trust domain it was created under.

The agent can verify that all services it communicates with have valid certificates within the same trust domain as the agent.

The agent can validate service certificate host names and roles.

The agent can check the CRL for revocation.

Services

The agent service can validate that incoming connections from endpoints reference an agent certificate signed by the same CA as the system.

The agent service can be configured to only allow unsigned or self-signed agent certificates during the process of adding a new agent to the system.

Each service can be configured to obtain a signed certificate for its host name and role.

Services can validate connections to ensure that the certificates are valid, and reference the correct host name and service role.

Information Schema

The system can be configured so that the schema used is a superset of the Mandiant™ OpenIOC Framework with extensions and modifications to address our customized requirements. Where possible, the schema can remain in-sync with updates to OpenIOC.

Tasks

Uninstall

This task can be configured to instruct the agent to remove itself, with configurable options to control the removal of the local certificate, cached audit bundles, etc.

Execute Audit

This task can be configured to instruct the agent to execute one or more audit modules, with configurable options to control the caching of results, audit module parameters, etc.

Transfer Audit Bundle

This task can be configured to instruct the Agent to transfer an audit bundle to a specified location, with parameters to control rate limits, resume points, delete after upload confirmation, etc.

Manage Audit Bundles

This task can be configured to instruct the agent to list, purge, modify, or otherwise handle local audit bundles.

Update Agent Software

This task can be configured to instruct the agent to update itself with the provided installation bundle.

Update Agent Configuration

This task can be configured to instruct the agent to update its local configuration with the supplied configuration.

Audit Bundles

Audit results produced by the agent can be stored within a forensic file container. The file container can possess the following properties:

Allows for the storage of one or more files (composed of arbitrary binary streams).

Allows for the files to be digitally signed.

Provides a cryptographically secure hash of data streams (implied by the requirement above).

Allows for the data to be encrypted at rest.

Allows for compression within the container.

AFF is an open file format that is not encumbered by licensing restrictions and satisfies all of the above.

The layout of the contents of the audit bundles can depend on the overall schema in use by the system for storing items such as task error logs, task scripts, task results, raw binary collected files, memory dumps, etc.

Audit Types

File Audit Module

This module can be configured to collect information about local file systems, including file system metadata, mime-type, file metadata, file content analysis, etc. This module can support the collection of files for preservation, bypassing file locks, bypassing the VFS layer and the NTFS driver, if necessary.

Prefetch Audit Module

This module can be configured to collect information contained in system prefetch cache.

Scheduled Task Audit Module

This module can be configured to collect information about tasks scheduled using the windows task scheduler.

Registry Audit Module

This module can be configured to collect information about registry hives, including registry key timestamps, key value pairs, permissions, and ownership.

Event Log Audit Module

This module can be configured to collect local system event logs, including time information, log source name, and fully resolved event messages.

System Restore Point Audit Module

This module can be configured to collect information contained in system restore points.

Process Audit Module

This module can be configured to collect information about running processes and threads, ownership, arguments, relationship, memory layout, tokens, session information, timestamps, handles, hooked APIs, and executable modules. This module can support the preservation of executable modules, memory regions, or the entire memory dump of a process.

Kernel Driver Audit Module

This module can be configured to collect information about kernel drivers including their names, locations, elevation, etc. This module can also support the preservation of kernel drivers.

Kernel Hook Audit Module

This module can be configured to collect information that may indicate the presence of kernel hooks, associated modules, and hooked function.

System Information Audit

This module can be configured to collect high level system information including system name, local user accounts, domain membership, time configuration, local storage, etc.

Services Audit Module

This module can be configured to collect information about services configured on the system, including their names, command lines, running status, tokens, etc. This module can be configured to support the preservation of related files and executable modules.

Network Connection Audit Module

This module can be configured to collect information about network connections, open ports, and their associated processes.

Memory Dump Audit Module

This module can be configured to collect a forensically sound image of memory in a standards-compliant format for preservation and analysis. Processing of the memory image is not necessarily performed.

Portable Executable Support Module

This module can be configured to be subordinate to other modules and provide for the extraction of PE meta-data from files or other data sources representing PE modules. This module may be referenced by the file audit module, the registry module, or the process module, for example.

Office Document Support Module

This module can be configured to be subordinate to other modules and provides for the extraction of office-document meta-data. This module may be referenced by the file audit module for example.

System Access Control and Content Dissemination

Access Control

Content can be generated from the endpoint via the agent, this content can then be provided up to the server.

During the configuration of the server, access to the content, to include but is not limited to the organizational information, system content, network content, network device content, can be configured via user access control lists. Public/Private keys can also be used to apply user access to the content.

Content where the user does not have proper privileges the content can be obfuscated from the users view.

When applicable, the content will be broken down into fields, user access will also be applied to these fields.

If multiple servers and or levels are used, these access control mechanisms will be enforced through the content dissemination process.

Inoculation packages can be crafted at the interface and protected via the user access system.

Content Dissemination

Standardized content can be disseminated/exported to additional servers or applicable rendering applications.

The protection level of the content can be decided by the originating operator.

Based on the analysis of the results inoculation packages can be generated, this includes, but is not limited to, executable files, scripts, signatures and internet protocol lists. These inoculation packages can be distributed via the architecture of the system.

If organization information is obfuscated, representative data can be generated so higher order servers can logically identify and represent/render the data.

All protection mechanisms will be enforced and maintained throughout the system.

High-Speed Network Data Capture

Driving towards a "domain package." Find a way for a human to be able to parse the data. Endpoint information+ network traffic information.

Domain package allows the queries. Collect all information from the network, and index certain pieces into a high-speed index. (see below) Indexes are pushed into a repo. Output from IDS pushed into repo. All logs go into the repo. Can then run a query in a manageable way. Has diagrams for the query structure.

Network Traffic Indexing

One source of information in network security forensic analysis is the actual network traffic data itself. This traffic represents of the information that is sent to and from the computers that are potentially affected by the actors trying to use those resources for their own purposes.

Due to the large number of ways that computer networks are used in business today, the bulk of communication data on a network is often very large. Relevant data that suggests some illicit activity on the network is quite diverse in nature and also very small in size when compared to the overall bulk of the traffic.

Because of the diversity in what may be useful in detecting the illicit activity, there are a large number of tools in the industry to help analysts to recognize these activities and to understand how they work. For a large number of tools to interoperate effectively, standard methods of storage and representation of network traffic for future analysis were devised. The most commonly used file format for this is referred to as "pcap" format, "pcap" being a contraction of the words "packet capture" since network traffic is sent in groups of data called packets.

Because of the diverse nature of what data might become interesting as an investigation proceeds, it is generally useful to have all of the captured data available for further examination. As new bits of the network attack are understood, new directions of interest arise which will require different types of analysis in search of other information. These cannot usually be predicted effectively before the investigation starts which explains why all of the traffic is needed even though only a small portion of it will be useful in the end.

Although there are a large number of tools available for working with network data in pcap format, there are not many tools that were designed to handle huge collections of data, (sometimes terrabytes in size), to operate on efficiently. We are thus left with the problem of how to winnow the captured data to a more useable size.

The system can include a network traffic indexing tool configured to allow the user to generate a subset of the complete dataset for use with any of the tools that operate on pcap files.

As the data is captured, (or on command later), the tool (a) makes index files for all of the pcap files. The tool can then be used to (b) select certain traffic to be copied into a new pcap file that can be more easily used in the other tools. By using the index files during the processing of a query, the entire set of captured data can be scanned for the desired portions relatively quickly.

The query syntax is designed to include the packet in the resulting pcap file if the specified packet property has matched.

The query can be composed of any combination of the following search criteria:

ip <ip list>: source or destination ip matches this specified address
  sip <ip list>: source ip matches this specified address
  dip <ip list>: destination ip matches this specified address
  port <port list>: source or destination port matches this specified port
  sport <port list>: source port matches this specified port
  dport <port list>: destination port matches this specified port
  from <MM/DD/YYYY HH:MM:SS>: matched packets must also be after this time to be included
  to <MM/DD/YYYY HH:MM:SS>: matched packets must also be before this time to be included Square brackets can be used in one of the list items to specify a source/destination relationship. Examples:

-ip 10.0.0.1 [10.0.0.2] source 10.0.0.1 and destination 10.0.0.2 OR source 10.0.0.2 and destination 10.0.0.1 will match this
  -sip 10.0.0.1 [10.0.0.2] only source 10.0.0.1 and destination 10.0.0.2 will match this
  -dport 80 [10000] only source 10000 and destination 80 ports will match this Any IP specification can use CIDR notation to specify a subnet such as: 192.168.0.0/24.

There is a commonly used filtering syntax for choosing packets that can be used with this tool to further limit which packets are included in the results of the query. The name of this syntax is "Berkeley Packet Filter" of "Bpf". When a bpf filter string is specified as part of the query syntax, an intermediate pcap file is created just as if the bpf filter was not present. Then the intermediate file is passed through the filter to further select the packets for the final results file.

In some embodiments, the way the pcap files should be indexed might better be handled differently. For example, some cases can be configured to spend less time on indexing the pcap files and move some of the processing to the querying phase. Sometimes the index files should be compressed to allow for less storage expansion on the file system holding the captured data.

Any number of indexing and querying methodologies can be implemented. A command line switch ("t") for specifying which type of methodology to employ can be implemented.

The system can further be configured so that a folder can be specified to "watch". As new pcap files are deposited into one of the "watched" folders, the indexing process will begin immediately, making it unnecessary to later begin the indexing process on the entire folder.

Privacy Enhancing Bloom Filters

As a non-limiting example, Bloom filters can be used as a suitable caching layer above direct access to an authoritative data source (workstation, drive image, etc.) when performing basic token searches. The system can be configured such that it could optionally allow the capture of string Bloom filters, thereby increasing performance for some IOC matching techniques Bloom filters can be used in the system to reduce the amount of communication that is required to check on the breadth multiplied by the depth of data needed to collect for detailed queries. Bloom filters can be used to narrow down which hosts from which to get more detailed information to perform the more involved queries. By this technique, it may not be necessary to send all of the data for all of the hosts but rather only all of the data for a much smaller number of hosts.

Storage System

The system can include a solid state storage appliance for large scale storage of data and efficient access to the stored data. In some embodiments, NAND flash memory storage can be used. Solid state storage has the advantage of higher speeds, reduced vibration, heat, and noise and improved power efficiency.

System High Level Configuration

The system allows for scalability regarding the applications that may be supported. To achieve the scalability, the system can include modules that may be linked together to extend the storage capacity. The module design is such that operations requiring searching through the data can be processed by a distributive approach by multiple modules simultaneously.

Communication between the modules can be performed by high speed network connections between the modules. A normal configuration of 2 to 6 modules can be linked together by using a daisy chain approach where each module forwards appropriate communications to the next module in the chain. For applications that require more than 6 modules, a different arrangement could include a pyramid shaped tree configuration to enable more efficient communications to the nodes that are further out from the main node.

In the daisy chain configuration, each chain of modules will include a head module which will be responsible for servicing requests from outside clients to the system. If the size of the system is only one unit, then there will only be a head unit. In solutions where more than one unit is required, there will be a Head module, a Tail module, and optionally a variable number of Chain modules logically inserted between them.

Module roles can be managed according to changes in the system status. For instance, if a motherboard casualty in the system causes a module to cease operating, the network cabling in the daisy chain can be reconnected to skip over the dead unit and the remainder of the system should continue operating with minor reconfiguration operations. When the dead unit is back online, it can be inserted back into the system.

Head Module

The head module will have one or more network connections that will be configured to function on the external host network. These connections will exist to allow outside client machines to make any required requests to and receive results from the storage appliance.

Chain Module

The chain modules can be used for expanding the amount of storage in the system. This is the primary method to implement the scalability aspects of the system design.

Tail Module

The tail module can be functionally the same as a Chain Module except where stream capture applications are concerned. In stream capture applications, the Tail module will also have a high speed network port configured to be the stream input port to the system. A software component on the Tail module will manage the appropriate system dissemination of the captured data.

Hardware Components of a Module

The system can include a printed circuit board designed to shrink the footprint of the storage medium, referred to as a pseudoSSD or pSSD. The printed circuit board can be housed in a standard 4u rack mount full size case that will support ATX form factor pc components and will have space to add the racks of solid state drives pSSDs.

A suitable ATX form factor PC motherboard may include the following features: long life construction, good MBTF rating, provision for heavy processing power, onboard raid functionality for SATA ports on the motherboard, and large number of PCIe slots with good throughput ratings.

The ATX form factor switching power supply may include the following features: extremely well rated for long life, excellent MBTF rating, have sufficient 5 volt supply to power the SSD arrays above the other normal requirements of the module's normal PC components, and may be a redundant power supply arranged in 1 ATX power supply form factor.

An extremely high speed network card can be used (such as a Mellanox card), to be plugged into one of the PCIe slots on the motherboard. This card can have two ports that can support full duplex communications on both ports at full speed simultaneously. The system can include 8 port SATA controllers or 8 port RAID SATA controllers. The remainder of the PCIe slots can each contain one of these controller cards. Each port of the controller will be connected to one pSSD. The system can include multiple, in some cases 3 or 4, high capacity high performance data center class spinning hard drives for use in indexing and query results construction operations. If 3 or 4 of these are specified, they can be used in a raid 5 configuration to allow for improved failure recovery.

Sufficient pSSD boards can be racked to fulfill the applications storage requirements of the module up to one per SATA port on the controllers plugged into the PCIe slots. A full module may house 8 times the number of PCIe slots available for SATA/RAID controller cards.

pSSD Design

The pSSD printed circuit board can be designed to hold 16 mSATA 50×30 mm SSD drives. The can be mounted 8 to each side. The design may use a multiplier chip in a 2 stage cascade configuration to make the 16 SSD drives appear to the host system as a single large SSD drive. Each chip can be configured to multiply one SATA host connection to 4 SATA device connections. Stage one can consist of one multiplier chip which will connect to the 4 additional multiplier chips of stage two. The stage two multiplier chips can each connect to 4 of the SSDs mounted on the board. The board can have a single standard SATA data plug and SATA power plug for connection to the system. The size of the pSSD board may be approximately 5 inches by 6 inches and about 10 mm in thickness. These boards may be racked with a tight spacing on 15 mm centers board to board. The rack will contain a couple of extra unused slots so that failed pSSD boards can be replaced without bringing down the system at a later date.

Example System Applications

Network Capture

Advances in network speed and network business use expansion has made the task of network security more difficult. One of the most useful resources for network security analysts to be able to reconstruct the attack and scope of the effects of a security event is to have a recording of all of the network traffic. The sheer volume of data makes this a challenging problem. With that much volume, the parts of the traffic that are relevant to the event are usually relatively small. It is not only a problem of storage of the vast amount of data, but also to gain access to only the small part of relevant data in an efficient manner. Many different aspects of the data are used to select potentially relevant data for review. The system described herein can be designed to address these issues directly.

The system described herein can be used as a network recording/traffic retrieval solution.

Wear Due to Writes

Because of the physical properties of the flash technology, each memory cell can only be written to a limited number of times before it begins to fail. This number of times is quite large but still warrants some concern from an engineering perspective. Using the systems and methods described herein, as we network traffic is recorded, the oldest data is removed to make room for newer data. The arrangement can be configured to operate as an oversized circular buffer. If there is enough storage space for 30 days of traffic storage, then each memory cell will only be written to once every 30 days. This can reduce the possibility that a memory cell will fail due to excessive writes in the lifetime of the system.

Capture Process

When a new traffic capture file is created, the system modules can determine amongst themselves which one has the oldest network traffic data stored on it. That unit deletes the oldest files until there is room (with some extra space) for a new file to be recorded. The traffic is then directed to that unit in the chain of modules until a full capture file is completed at which time the process begins again.

Query Service

When an analyst needs to see the traffic related to a specific question about an event, the analyst can issue a query to the system and the system will construct a new network traffic file containing the network packets requested. Servicing this query against such a large volume of data usually takes a long time to process in typical computing environments. This system can use the fact that there are many threads that can be processed simultaneously in each module to obtain the packets requested. Each thread would be responsible for getting the data from its assigned logical storage area, and since those would be aligned with the SATA/RAID controllers, they could all be operated at the same time. This distribution of query processing on solid state storage dramatically reduces the time it takes to process the query. Each of the modules would return its packets to the Head module for assembly into the query response file, and then the Head module would forward the results to the client host that made the request.

Query Language

Queries could be constructed using an application specific language with terms as described below:

bpf: this specification requires a string formatted in the Berkeley Packet Filter format. The normal result file will be constructed on the system but before the results are returned the bpf will be applied to the file to further reduce the results. The resulting file will then be returned to the requesting host.

raw: Indices are maintained to quickly retrieve packet data from the storage files. Some variables of packets are not indexed. Notably certain infrequently encountered protocols belong to this category. The entire contents of the stored files that have data within the specified time frame must be searched when a query is made based on one of these protocols. This takes longer, but can return more esoteric data.

rawu: Some protocols are not supported for queries at all. This term is similar to the "raw" term but also includes a second file that has unsupported protocol packets that were captured in the specified time frame in a separate results file.

ip: Specifies that packets that are from or to the specified IP (internet protocol) address should be returned in the results. Lists of whitespace delimited IP addresses may be used.

dip: Specifies that packets that are sent to the specified IP address should be returned in the results. Lists of whitespace delimited IP addresses may be used.

sip: Specifies that the packets that are sent from the specified IP address should be returned in the results. Lists of whitespace delimited IP addresses may be used.

After any subject IP address is listed, it may be followed by a target list of IP addresses by using [ ]. Appended to any IP address in any list a subnet in CIDR format can be specified such as: 192.168.0.10/24. Appended to any IP address in any list a port may be specified by using a colon such as: 192.168.0.10:80. CIDR and port specifications can be combined on any IP address listed such as: 192.168.0.10/24:80.

port: Return packets that have the specified port as the source or destination.

sport: Return packets that have the specified port as the source.

dport: Return packets that have the specified port as the destination.

from <yyy/mm/dd hh:mm::ss>: Only return packets that were captured after or at the specified time.

to <yyy/mm/dd hh:mm::ss>: Only return packets that were captured before or at the specified time.

pd <number of days>: Only return packets that were captured in the last number of specified days.

ph <number of hours>: Only return packets that were captured in the last number of specified hours.

maxres: Specifies the maximum size of the result file in Mbytes.

Disk Image Server

At facilities that archive images of system and data drives for forensic evidence, analysis, or any other purpose, this system and methods described here can be used for saving an arbitrary quantity of images, and making the images available for fast retrieval when the need arises. If the facility has the capability for extremely high speed networking (e.g., 40 Gb/s) this could be supported to the client host computer making retrieval of the large files very fast.

Multimedia Streaming Service

The systems and methods described herein could be used to provide a streaming service of a large amount of huge multimedia assets, such as movies on demand.

System Architectures

The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions.

In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as a CRT (cathode ray tube), LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Ruby™, Flash™, JAVA™, C++, C, C#, Visual Basic™, JavaScript™, PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any operating system or environment executing in a virtualized or non-virtualized environment, using any programming language suitable for software development, including, but not limited to, different versions of Microsoft Windows™, Android™, Apple™ Mac™, iOS™, Unix™/X-Windows™, Linux™, etc. The system could be implemented using a web application framework, such as Ruby on Rails.

The processing system can be in communication with a computerized data storage system. The data storage system can include a non-relational or relational data store, such as a MySQL™ or other relational database. Other physical and logical database types could be used. The data store may be a database server, such as PostgreSQL™, MongoDB™, Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. The figures herein represent example use cases for the syntactic tagging system and are not intended to be limiting on the scope of the invention. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

We claim:

1. A workflow system for executing a query on network traffic data in connection with incident response, the system comprising:
    agent software for execution at an endpoint, the software configurable for executing computer instructions for:
        detecting a security event at the endpoint;
        storing structured audit information relating to the detected event in a forensic file container;
        transmitting the audit information relating to the event to an agent service as a forensic file container;
    a processor configured at the agent service for managing multiple instances of the agent software executing at multiple endpoints and for receiving forensic file containers;
    a processor configured for acquiring network traffic data;
    a data store device for storing the network traffic data in a first packet capture file;
    a processor configured for network traffic indexing by:
        generating a subset of a dataset of the first packet capture file; and
        generating a second packet capture file as an index based on the first packet capture file by selecting a subset of the network traffic data;
    a processor configured for executing a query by:
        receiving one or more parameters relating to information in the forensic file container;
        identifying one or more parameters relating to network traffic data in the forensic file container; and
    a processor configured for executing a query on the index for corresponding data in the first packet capture file, where the query parameter for the index file is based on the one or more parameters relating to network traffic data in the forensic file container; and
    a processor configured for providing results responsive to a query on the acquired network traffic data through a secured web interface accessible only to clients with a current credential, an associated user certificate, or a secure token.

2. The system of claim 1, wherein the query is based on a source internet protocol address or a destination internet protocol address match of a specified internet protocol address.

3. The system of claim 1, wherein the query is based on only a source internet protocol address match of a specified internet protocol address.

4. The system of claim 1, wherein the query is based on only a destination internet protocol address match of a specified internet protocol address.

5. The system of claim 1, wherein the query is based on a source or destination port match of a specified port.

6. The system of claim 1, wherein the query is based on only a source port match of a specified port.

7. The system of claim 1, wherein the query is based on only a destination port match of a specified port.

8. The system of claim 1, wherein the query is based on a packet time after a specified time.

9. The system of claim 1, wherein the query is based on a packet time before a specified time.

10. The system of claim 1, wherein the processor is further configured for defining and utilizing a common data structure for the packet capture files.

11. The system of claim 1, wherein the event detection is based on the output of a registry audit module.

12. The system of claim 1, wherein the event detection is based on the operation of a Bloom filter.

13. The system of claim 12, wherein the event detection is based on finding anomalous activity at the endpoint.

14. The system of claim 1, wherein the endpoint is an intrusion detection system.

15. A workflow method for executing a query on network traffic data in connection with incident response, the method comprising:
    providing agent software for execution at an endpoint, the software configurable for executing computer instructions for:
        detecting a security event at the endpoint;
        storing structured audit information relating to the detected event in a forensic file container;
        transmitting the audit information relating to the event to an agent service as a forensic file container;
    executing an agent service at a processor configured for managing multiple instances of the agent software executing at multiple endpoints and for receiving forensic file containers;
    acquiring network traffic data;
    storing the network traffic data in a first packet capture file in a data store device;
    indexing the network traffic by the processor by:
        generating a subset of a dataset of the first packet capture file; and
        generating a second packet capture file as an index based on the first packet capture file by selecting a subset of the network traffic data;
    executing a query at the processor by:
        receiving one or more parameters relating to information in the forensic file container;
        identifying one or more parameters relating to network traffic data in the forensic file container;
    executing a query on the index for corresponding data in the first packet capture file, where the query parameter for the index file is based on the one or more parameters relating to network traffic data in the forensic file container; and
    a processor configured for providing results responsive to a query on the acquired network traffic data through a secured web interface accessible only to clients with a current credential, an associated user certificate, or a secure token.

16. The method of claim 15, wherein the query is based on a source internet protocol address or a destination internet protocol address match of a specified internet protocol address.

17. The method of claim 15, wherein the query is based on only a source internet protocol address match of a specified internet protocol address.

18. The method of claim 15, wherein the query is based on only a destination internet protocol address match of a specified internet protocol address.

19. The method of claim 15, wherein the query is based on a source or destination port match of a specified port.

* * * * *